(12) United States Patent
Grigsby et al.

(10) Patent No.: US 9,065,835 B2
(45) Date of Patent: Jun. 23, 2015

(54) REDIRECTING WEB CONTENT

(75) Inventors: Travis M. Grigsby, Austin, TX (US);
Thomas J. Freund, Austin, TX (US);
Albert A. Lamb, Somerville, MA (US);
Lee M. Surprenant, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 980 days.

(21) Appl. No.: 13/156,152

(22) Filed: Jun. 8, 2011

(65) Prior Publication Data

US 2011/0238828 A1    Sep. 29, 2011

Related U.S. Application Data

(63) Continuation-in-part of application No. 12/178,052, filed on Jul. 23, 2008, now Pat. No. 7,979,538.

(51) Int. Cl.
*G06F 15/173*    (2006.01)
*G06F 15/16*    (2006.01)
*H04L 29/08*    (2006.01)

(52) U.S. Cl.
CPC ........... *H04L 67/104* (2013.01); *H04L 67/1023* (2013.01); *G06F 15/173* (2013.01); *G06F 15/16* (2013.01); *H04L 67/02* (2013.01); *H04L 67/2842* (2013.01); *H04L 67/1012* (2013.01); *H04L 67/1085* (2013.01); *H04L 67/288* (2013.01)

(58) Field of Classification Search
CPC ..... G06F 15/173; G06F 15/16; H04L 67/104; H04L 67/28; H04L 67/1023; H04L 67/1002
See application file for complete search history.

(56) References Cited

U.S. PATENT DOCUMENTS

| | | | |
|---|---|---|---|
| 7,362,776 B2 * | 4/2008 | Meier et al. | 370/468 |
| 8,412,764 B1 * | 4/2013 | Liskov et al. | 709/201 |
| 2003/0009587 A1 * | 1/2003 | Harrow et al. | 709/238 |
| 2004/0024727 A1 * | 2/2004 | Bowman | 707/1 |
| 2009/0282105 A1 * | 11/2009 | Kamiya | 709/204 |

* cited by examiner

*Primary Examiner* — Joshua Joo
*Assistant Examiner* — Younes Naji
(74) *Attorney, Agent, or Firm* — Patents on Demand P.A.; Brian K. Buchheit; Scott M. Garrett

(57) ABSTRACT

A peer group can be established for sharing Web cache data among a set of computing devices through a peer-to-peer network. The Web cache data can be used by each of the computing devices to respond to requests issued over a client-server network from a Web browser running on that computing device. Web cache data can be exchanged among the peers of the peer group via the peer-to-peer network. A client request issued from a Web browser of one of the computing devices can be satisfied using Web cache data obtained from a different one of the computing devices in the peer group. The client request can be a request to one of the Web servers for Web content. The server associated with the request may never provide the Web content responsive to the client request, which is obtained instead from the different one of the computing devices.

23 Claims, 6 Drawing Sheets

REDIRECTING WEB CONTENT

CROSS REFERENCE TO RELATED APPLICATION

This application claims priority to application Ser. No. 12/178,052 entitled "REDIRECTING WEB DOWNLOADS" filed on Jul. 23, 2008 and is incorporated in its entirety herein.

BACKGROUND

This disclosure relates to web downloads, and more particularly to Web caches.

Web servers are often called upon to deliver web content to multiple visitors of the web server. When a web site catches the attention of a large number of people, an internet flash crowd may occur. An internet flash crowd may overburden a web server or a group of web servers. It may be costly for a web service provider to maintain the hardware, software, and bandwidth capacity necessary to withstand the content requests and demands of a flash crowd while avoiding decreased performance.

Web content downloaders (e.g. users of web browsers) often retain downloaded web content from a website in a cache. The downloaded web content may be retained so that it can be recalled when that users revisits the same website before the downloaded web content is removed from the cache.

BRIEF SUMMARY

In one embodiment, a peer group can be established for sharing Web cache data among a set of computing devices through a peer-to-peer network. Each of the computing devices can be referred to a peer of the peer-to-peer network. The Web cache data can be used by each of the computing devices to respond to requests issued over a client-server network from a Web browser running on that computing device. Each of the requests can be issued from the computing devices to the Web servers using a client-server protocol. Web cache data can be exchanged among the peers of the peer group via the peer-to-peer network. A client request issued from a Web browser of one of the computing devices can be satisfied using Web cache data obtained from a different one of the computing devices in the peer group. The client request can be a request to one of the Web servers for Web content. The server associated with the request may never provide the Web content responsive to the client request, which is obtained instead from the different one of the computing devices.

In one embodiment, one or more downloads of Web content from one or more Web content servers can be monitored. Each of the one or more downloads can occur via a client-server request from a Web browser of one of a set of at least two client computing devices and via receiving a corresponding response from one of the Web content servers. A storage of the one or more downloads of the Web content within Web browser caches of the set of client computing devices can be tracked. A peer group of a peer-to-peer network can be established, which includes the set of client computing devices. Web content of the Web browser caches can be exchanged among the set of client computing devices via the peer-to-peer network. Download requests directed to the Web content servers can be satisfied utilizing Web content obtained from the Web browser caches via the peer-to-peer network. Each of the download requests can be a client-server request from one of the computing devices to one of the Web content servers.

In one embodiment, a Web content cache can be maintained at a client device, which comprises cached data from Web browser activities performed between the client device and a set of Web servers. The cached data can be utilized by the Web browser to respond to subsequent Web browser requests issued to one of the set of Web servers without having to obtain new data from any of the Web servers. That is, the subsequent responses are able to be handled by retrieving cached data from the Web content cache. A peer group of a peer-to-peer network can be established, which includes the client device and a set of remotely located client devices. At least a portion of the cached data can be sent from the client device to at least one of the remotely located client devices via the peer-to-peer network. The remotely located client devices are able to utilize the cached data to handle Web browser requests issued from these remotely located client devices to the Web servers without having to obtain new data from any of the Web servers. Peer-shared cached data can be received from the remotely located client devices via the peer-to-peer network. The peer-shared cached data is able to be utilized by the Web browser to respond to subsequent Web browser requests issued to one of the set of Web servers without having to obtain new data from any of the Web servers.

DETAILED DESCRIPTION

Figure 1:
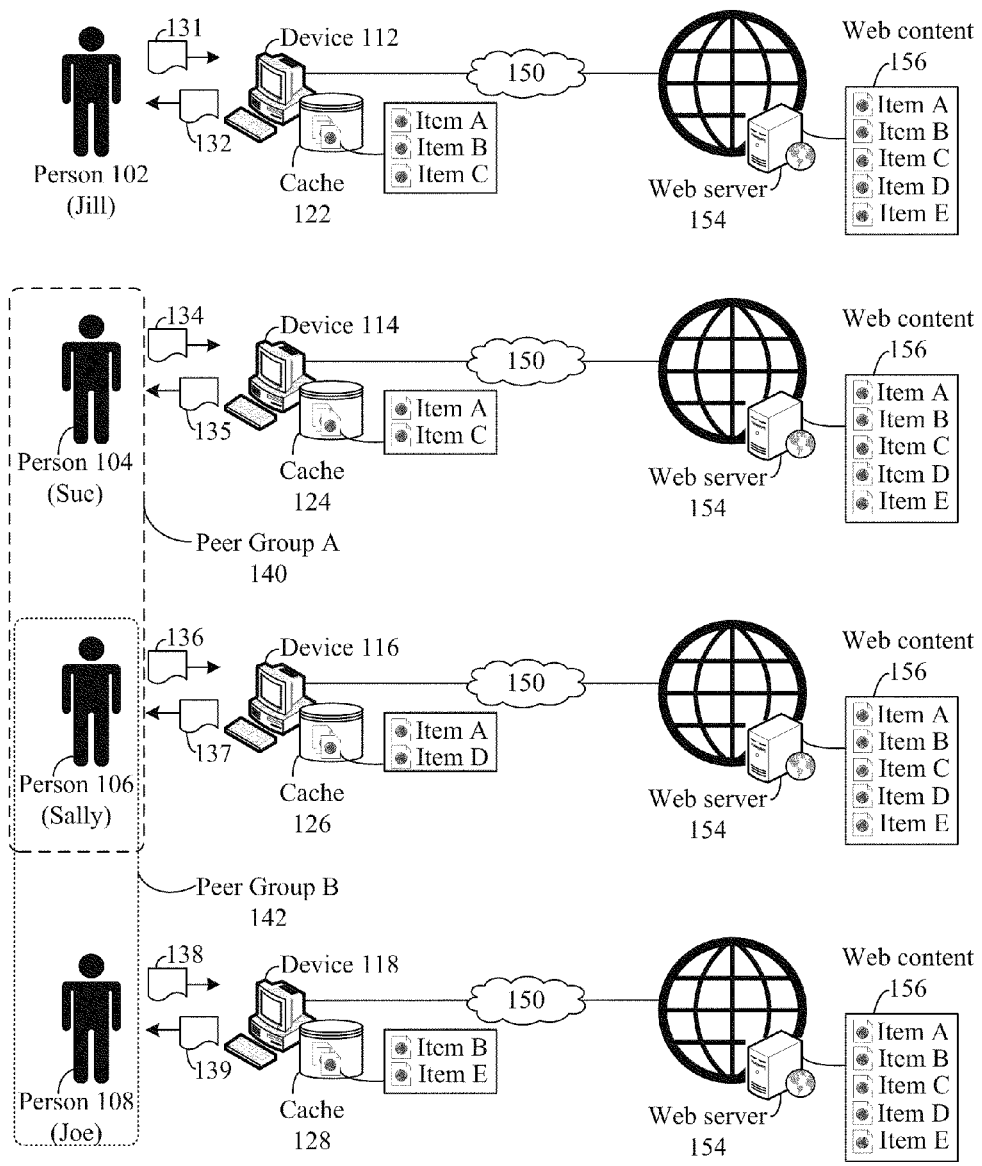
FIG. 1 shows a diagram where Web cache information can be shared among a set of people using peer-to-peer (P2P) technology in accordance with an embodiment of the disclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a diagram 100 where Web cache information can be shared among a set of people using peer-to-peer (P2P) technology in accordance with an embodiment of the disclosure. In diagram 100, as set of different people 102, 104, 106, 108 (referred to as Jill, Sue, Sally, and Joe) can access Web content 156 served over a network 150 by a Web server 154 from a Web browser running on a computing device 112, 114, 116, 118. Each computing device 112, 114, 116, 118 can store content within a local cache 122, 124, 126, 128. The disclosure establishes different peer groups 140, 142 (referred to as Peer Group A and Peer Group B), where cached content (from cache 122-128) is shared among members of the peer groups 140, 142 in accordance with a set of established and configurable rules, conditions, and constraints.

In various embodiments, the Web cache sharing via peer-to-peer technology can be implemented using software running on the clients (112, 114, 116, 118) only, running on middleware only, running on Web servers (154) only, and/or combinations thereof, as shall be explained herein. Further, the peer-to-peer technology utilized herein can include a distributed peer-to-peer network lacking centralized server control or can include a server-dependent peer-to-peer network, where a centralized server indexes P2P content of local data stores.

It should be understood that some advantages achievable in embodiments of the disclosure require relatively tight coupling between Web browser functionality and peer-to-peer functionality implemented on a client device 112, 114, 116, 118. This tight coupling permits security permissions, expiration times, updates, storage limitations, and other important factors to be established in a cooperative fashion. That is, typical peer-to-peer applications executing on client devices 112, 114, 116, 118 do not share content having dynamic characteristics as does a Web cache. This Web cache includes dynamic content, which can be sensitive and/or confidential in its collective sense, which is continuously being changed based on user activities on the internet. Assuming Web browsers and peer-to-peer applications are tightly coupled (and optimization algorithms are run considering both Web browsing and peer-to-peer factors) numerous combinative gains can be achieved, which are non-obvious until the tight coupling occurs (this tight coupling is not believed to be known outside of this disclosure).

The following use case examples express aspects of the disclosure. Jill (person 102) can initiate a request 131 from a Web browser that is directed to Web server 154 for Web content 156 Item A (before Item A is included in the cache 122). The request 131 can be sent over network 150, to Web server 154, which results in Item A being conveyed to the device 112 for further processing by the Web browser. Item A is also placed in the cache 122, so that subsequent requests 131 for Item A are provided directly from the cache 122, without being conveyed over the network 150. Items from cache 122 are periodically cleared based on conditions established by the Web browser, which controls the cache 122. Since Jill (person 6) does not share the cache 122 with other users, the cache 122 that she uses can be based exclusively upon her Web browser behavior.

In one extension of the shown use-case, Jill (person 102) can utilize multiple different computing devices 112 to access the Internet, where a peer group (not shown) is established among these devices 112, so that their cache 122 is shared. Thus, P2P cache 122 sharing can be used to ensure Jill's behavior is consistent (in regards to the cached data) across a set of different computing devices (which include device 112 and other devices that Jill uses). In one embodiment, Jill's browsers can have multiple different configurable modes, where the mode indicates whether behavior is cached and whether caches 122 are shared within a peer group. For example, if a home computer is used in a "work mode" then a browser cache when working in this mode can be shared with a cache of a work computer used by Jill. When browsing in a mode other than the work mode from her home computer, the browsing behavior (even if locally cached) will not be shared with the work computer. Thus, different browsing modes (user selectable) are contemplated which indicate whether or not browsing behavior is shared with other remotely located caches through P2P techniques.

In another illustrated use case, Sue (person 104) is a person belonging to Peer Group A (peer group 140). Sally also belongs to peer group A, which results in a P2P sharing between cache 124 and cache 126. Assuming bidirectional sharing between cache 124 and cache 126 (and assuming values as shown in diagram 100) Items A, C, and D are accessible from the browser of device 114 from a cache, while Items B and E require retrieval from Web content 156 provided by Web server 154. Thus, a request 134 for Item B will be fetched from the Web server 154, which would provide results 135; a request 134 for Item A will be fetched from cache 124 (and will be returned as result 135); and a request 134 for Item D will be fetched from cache 126 (and will be returned as result 135).

It should be appreciated that P2P sharing can be unidirectional (in either direction) or bidirectional. Unidirectional sharing in a P2P network is often referred to as "leeching", which is a situation where one peer chooses to receive information from the P2P network, without providing information to other peers in the P2P network. Bidirectional sharing in a P2P context is sometimes referred to as "being a good neighbor" or maintaining content as a "seed" that is a complete copy of the content so that others in the P2P network can download it. The disclosure contemplates use of any of a variety of P2P settings, such as bandwidth upload rate limiting, bandwidth download rate limiting, having a maximum number of concurrent connects, having a maximum number of connected peers per torrent, queuing a maximum number of active downloads, establishing different behavior in accordance with a scheduler, limiting processing consumed by P2P activity when a processor use is over a designated threshold, and the like. This behavior can be established at any device 114, 116, 118 participating in any peer group 140, 142. Additional network 150 level and/or Web server 156 level settings can be established, which affect Web cache 122-128 sharing behavior in various embodiments.

In the use cases of diagram 100, Joe is a member of Peer Group B, as is Sally. Assuming bidirectional sharing of cache 126, 128 content (and assuming values as shown in diagram 100) Items A, B, D, and E are accessible from the browser of device 118 from a cache, while Item C requires retrieval from Web content 156 provided by Web server 154. Thus, a request 134 for Item B will be fetched from cache 128 (and will be returned as result 139). A request for item A will be fetched from cache 126 (and will be returned as result 139). A request 138 for item C will be fetched from Web content 156 (and will be returned as result 139)

The example for Sally (person 106) is more complex, since Sally is a member of both Peer Group A and Peer Group B. Assuming bidirectional sharing of caches 124, 126, and 128, a request 136 for Item A, B, C, D, or E will be fetched from one of the caches 124, 126, 128 as a result 137. Other assumptions produce different results.

Assume, for example, that Joe is a leecher (and does not share cache 128 content) but Sally and Sue share content bi-directionally, a browser of device 116 (Sally's device) will have access to cached Items A, C and D only, where Items B and E would have to be obtained from the Web server 154. Assuming that Sue is a leecher, but that Sally and Joe share content bi-directionally, a browser of device 116 will have access to cached Items A, B, D, and E, where item C would have to be obtained from Web server 154. Assuming Sally is a leecher and Sue and Joe share cached data, then Sue will have access to cached Item A and C only (from cache 124); Sally will have access to cached items A, B, C, D, and E (from caches 124, 126, and 128); and Joe will have access to cached items B and E only (from cache 128).

It should be noted that the content of the caches 122-128 can be dynamic, as the P2P links can be constantly copying content from one cache 122-128 to another. In one embodiment, a target "seed" value can be maintained per peer group 140, 142 that strikes a balance between content availability from a cache within that peer group and wasted memory of local data stores. For example, it can be beneficial for a peer group to maintain target ranges of content availability. Availability levels of a content item over a designated range can represent inefficient use of memory space across a peer group 140-142. Availability levels of a content item under a designated range can represent a possible bottleneck (and or can place a disproportionate burden on one of the peers of the peer group 140-142). In one embodiment, complex considerations at a peer group level (such as device 112-118 load and capabilities, cache 122-128 size, peer group 140-142 needs, content item importance, content item size, server 156 load for the original content 156, bandwidth load of the network 150, peer proximity, and the like) can be factors used to determine whether content items should be copied into any particular cache 122-128 and/or retained in any particular cache 122-128 for the overall benefit of the peer groups 140, 142.

As used herein, a cache 122-128 can be a component of a computing device 112-118 that transparently stores data so that future requests for that data can be served faster. The data (Items A-E) that is stored within a cache can include Web content 156 that was previously fetched from one or more Web servers 156. The Web content 156 that is situationally cached can include, but is not limited to, Web pages, portions of Web pages, downloaded files, playable media, client-side executable, and the like. The cache 122-128 can be implemented as an abstraction layer that is designed to be invisible from the perspective of neighboring layers. Use of the Web caches 122-128 can reduce a quantity of requests 131, 134, 136, 138 that are sent to the Web server 154. Use of cached content is typically faster than receiving content from the Web server 154, but situations exist in the disclosure, where performance resulting from retrieving content from peer caches may be slightly less than results obtained by receiving equivalent content from the source Web server 154. Scaling efficiencies and other advantages expressed herein may, nevertheless, make P2P cache use a beneficial technique for obtaining Web content.

To elaborate, conventional wisdom (believed to be incorrect) is that P2P sharing is not a beneficial solution for relatively small files, which is typically the case with content contained in Web server caches 122-128, because overhead incurred from administering P2P sharing can be greater than performance gains (data payload) in optimal circumstances, where single source downloading from a Web server 154 is possible (e.g., no substantial bottlenecks are encountered when obtaining Web content 156 from a Web server 154). Conventional wisdom fails to account for situations where a Web server 154 is down or crippled by a proliferation of http sessions or bandwidth limit transgressions, in which case the Web content 156 is inaccessible directly. This situation is common, when flash crowds (also called flash mobs) are present. A flash crowd is a group of people who suddenly assemble for a brief period of time, then just as rapidly disperse, which creates a huge and temporary spike of usage for a single Web server 154. Flash crowds can result from the Digg Effect, the Slashdot Effect, the Reddit effect, and the like (i.e., flash crowds can result when a popular linking site highlights content provided on a smaller site, causing a massive increase in traffic, which often results in the smaller site being overloaded). In such a situation, most end users (people 102-108) would be more than willing to sacrifice higher overhead (needed for a P2P sharing of content) to increase Web content 156 availability and accessibility. That is, some performance degradation (due to P2P sharing overhead) is a relatively small price to pay to ensure that desired Web content 156 is accessible.

Additional gains can be achieved by grouping cached items when P2P sharing, which effectively creates an aggregated file of multiple items (e.g., Item A-E) having a size equal to a sum of the composite sizes. Thus, in one embodiment, creation and sharing of cached content as intelligent groups of content can reduce P2P sharing overhead, while ensuring benefits of the sharing are retained.

In one embodiment, hashes can be used to identity unique portions of Web content 156. Periodic validations can occur that compare Web server 632 maintained hash values and hash value of P2P shared content, which helps to ensure data validity and to prevent a proliferation of inaccurate content via P2P sharing techniques detailed herein. For example, a hash can be generated for Item A maintained in cache 122, 124, and/or 126, which is compared to a hash for Item A maintained by the Web server 154. When the comparison fails, the cached item (Item A) can be discarded and/or refreshed from the server 154. Hash values can be used to help identify changed content at the server 154.

In one embodiment, a portion of Web content 156 from a request 134 can be stored in a cache 122-128 and shared among a peer group, while a different portion of the Web content 156 is retrieved from a Web server 154. For example, Web content 156 can be analyzed to distinguish relatively static content from relatively dynamic content. Relatively static content can be content that is modified at the source (e.g., Web server 154) with a frequency that is long relative to an expected reuse frequency. That is, the content is expected (or likely) to be reused one or more times before it is changed. Relatively dynamic content can be content that is rapidly modified at the source with a frequency that is short relative to an expected reuse frequency. For instance, if a Web site provides news articles, headlined articles may be considered relatively dynamic content (that is not to be cached) while historic articles (that are cached) may be considered relatively static content.

In one embodiment, cache 122-128 content can be proactively obtained via P2P sharing based on a set of definable factors, designed to anticipate or predict a need. For example, content items that are exceeding popular within a peer group 140, 142 can be automatically shared with caches 122-128 that lack these content items, based on an assumption that it is highly likely that the person 102-108 that hasn't accessed the popular content items, will probably request these content items soon.

In one embodiment, each cache 122-128 can be partitioned into multiple sections, where one section is shared among the P2P group 140, 142 and another section is not shared but is used locally. Selecting which content items are to be placed in which sections can be based on data driven rules. For example, content can be placed in specific sections based on content type. In this example, text content may be unshared (placed in a section of the cache 122-128 that is not subject to sharing) while images, video, and audio content are placed in a section of the cache 122-128 that is shared. In another embodiment, files (or objects) over a threshold size can be cached for sharing, while those under this threshold are not shared.

It should be emphasized that numerous criteria can be used to determine which of the persons 102-108 are placed in which of the peer groups 140, 142. In one embodiment, selection can be performed manually based on chooses of the people 102-108 themselves. In one embodiment, selection can be based on determined similarities in browsing habits (which can be continuously updated over time. In still another embodiment, membership in a particular peer group 140 can be based on a strength of relationship existing among the people 102-108, which can be determined using social networking metrics (i.e., # hops from user Y). Placement in peer groups 140 can be based on club (or organization) membership, on common interests, on geographic location, and are numerous other factors.

Figure 2:
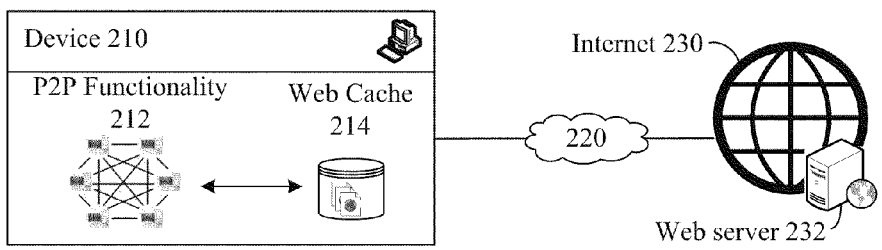
FIG. 2 shows numerous embodiments for implementing P2P Web cache sharing in accordance with the disclosure.
Figure 2:
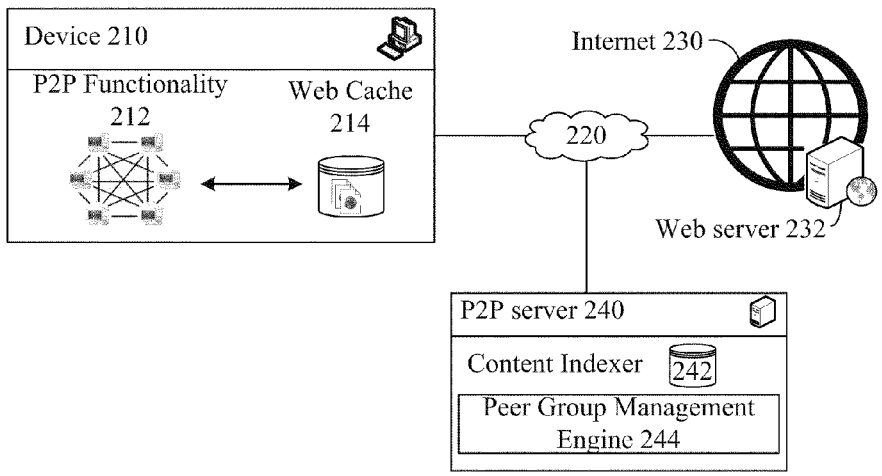
Figure 2:
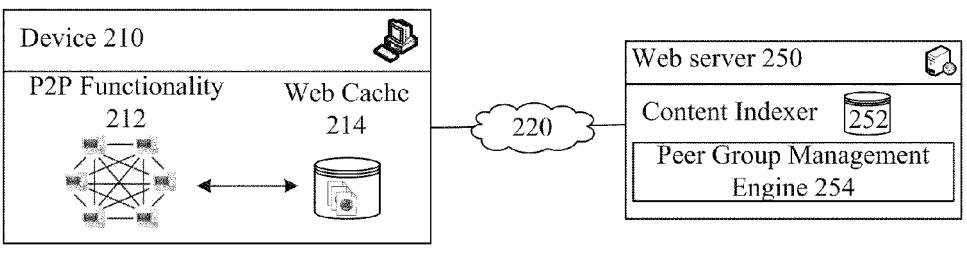

FIG. 2 shows numerous embodiments 202, 204, 206 for implementing P2P Web cache sharing in accordance with the disclosure. Specifically, embodiment 202 is for a client-controlled P2P cache sharing. Embodiment 204 represents an architecture in which P2P caching is centrally indexed using a network attached P2P server 240 (e.g., NAPSTER-like indexing). Embodiment 206 represents an architecture in which P2P shared caches are indexed and/or managed by a Web server 250. The embodiments 202, 204, 206 are not intended to be comprehensive and combinations of these approaches are to be considered within scope of the disclosure. Further, each of the embodiments 202, 204, 206 can be implemented in structured or unstructured P2P networks, as will be detailed herein.

It should be appreciated that the P2P functionality 212 refers to a sharing of Web cache 214 content using a peer-to-peer (P2P) system. A peer-to-peer system is a distributed application architecture (as opposed to a client-server architecture) that partitions tasks or workloads between peers. Peers can be equally privileged, equipotent participants of the P2P network. That is, peers make a portion of their resources, such as processing power, disk storage and/or network bandwidth, directly available to other network participants, without the need for central coordination by servers or stable hosts. Peers are both suppliers and consumers of resources, in contrast to the traditional client-server model where only servers supply, and clients consume.

Peer-to-peer systems often implement an abstract overlay network, built at the Application Layer, on top of the native or physical network topology. Such overlays are used for indexing and peer discovery and make the P2P system independent from the physical network topology. Content is typically exchanged directly over the underlying Internet Protocol (IP)

network. Anonymous peer-to-peer systems are an exception, as they implement extra routing layers to obscure the identity of the source or destination of queries. The peer-to-peer system used to share Web caches can be structured or unstructured.

In structured peer-to-peer networks, peers (and, sometimes, resources) are organized following specific criteria and algorithms, which lead to overlays with specific topologies and properties. Structured peer-to-peer networks can use distributed hash table-based (DHT) indexing. When DHT indexing is used, responsibility for maintaining the mapping from keys to values is distributed among the nodes, in such a way that a change in the set of participants causes a minimal amount of disruption.

Unstructured peer to peer systems can include pure peer-to-peer systems, hybrid peer-to-peer systems, and centralized peer-to-peer systems. Pure P2P systems can consist solely of equipotent peers. In pure P2P, only one routing layer is necessary, as there are no preferred nodes providing special infrastructure functions. Hybrid peer-to-peer systems can allow for specialized infrastructure nodes, which are often referred to as supernodes. In a centralized P2P system, a central server can be used for indexing functions and to bootstrap the P2P system. A centralized P2P system have similarities with a structured P2P architecture—yet in a centralized P2P system connections between peers are not determined by any algorithm, which is the case for structured P2P systems.

Referring to embodiment 202, a set of client-side computing devices 210 can implement a P2P functionality 212, which shares content of a set of Web caches 214 maintained by the devices 210. The Web caches 614 can dynamically change as a Web browser running on the device 210 is utilized. One notable advantage of embodiment 202, is that it can be implemented without a network 220 or Web server 232 being aware of that Web caches are being shared among a set of client devices 210. Thus, a set of end-users can form ad hoc P2P sharing groups (peer groups) by installing client-side software (no dedicated P2P network 220 servers need be maintained for embodiment 202 to function, yet one more of the client-side devices can perform indexing functions and/or act as specialized nodes (e.g., supernodes in the P2P network in contemplated embodiments). In one embodiment, the content of the Web caches 614 can be encrypted and source(s) obscured to ensure end-user privacy (regarding specific Web browser behavior) is maintained. For example, anonymous P2P techniques can be utilized, where special routing overly networks are used to hide physical locations of each node in the P2P network from other participants, and where pseudonyms can be used in place of real end-user information.

In embodiment 204, a centralized P2P server 240 can include a content indexer 242 and/or a peer group management engine 244. Thus, the P2P server 240 can function as a centralized server in a centralized P2P system (or as a supernode in a hybrid P2P system) or can functions a central server in a structured P2P system.

The P2P server 240 can be implemented within middleware in one embodiment. In another embodiment, the P2P server can be implemented at an edge of a network 220, which is distinct from a public IP network, such as internet 230. For example, network 220 can be an intranet (a virtual private network or local area network) used by a company, where P2P cache sharing is permitted among company owned/operated devices 210. Since company-specific Web browsing activities can be expected to have significant commonalities, gains can be achieved that are greater than those expected from an unrelated population of users. Further, sharing of Web caches can occur within defined geographic regions (saving on external bandwidth) in accordance with defined topographies in one embodiment. For example, proximate devices 210 in a network can be inferred using network IP addresses, and by grouping devices 210 having common IP gateways.

In one embodiment, new revenue streams can be achieved with embodiment 204, due to advertisement revenue. Typically, advertisement revenue can be provided to owners of the Web servers 232, which helps remunerate providers of content. In the case of Web-cache sharing, however, no direct communications need take place between requesting devices (e.g., device 210) and the Web server 232, when cached content is returned. Thus, a P2P server 240 can substitute unique advertisements in place of any original advertisements from Web server 232. This revenue stream (from replacement advertisements) can be used to support and maintain P2P server 240. In one embodiment, a revenue sharing arrangement can exist between an owner of Web server 232 and an owner of P2P server 240.

In one contemplated embodiment, the P2P server 240 can be a server that is directly referenced from a Web browser by a client device 210. For example, the Web server 232 can provide content for uniform resource locator "servercontent.com/index.html." The P2P server 240 can be associated with a domain name of "sharedP2P.com." A client can submit a request to "sharedP2P.com/servercontent.com/index.html, which sends a request to P2P server 240. When this content is cached, P2P server 240 can direct the device 210 to a suitable location. When this content is not cached, P2P server 240 can direct the device 210 to Web server 232 ("servercontent.com/index.html") and can optionally indicate that this "new" content is to be retained in a client-side cache and shared with others in the P2P network. In one contemplated embodiment, the Web server 232 can cooperate with P2P server 240 by redirecting traffic to it (sending client requests to sharedP2P.com/servercontent.com/index.html), when the Web server 232 is overloaded.

Figure 5:
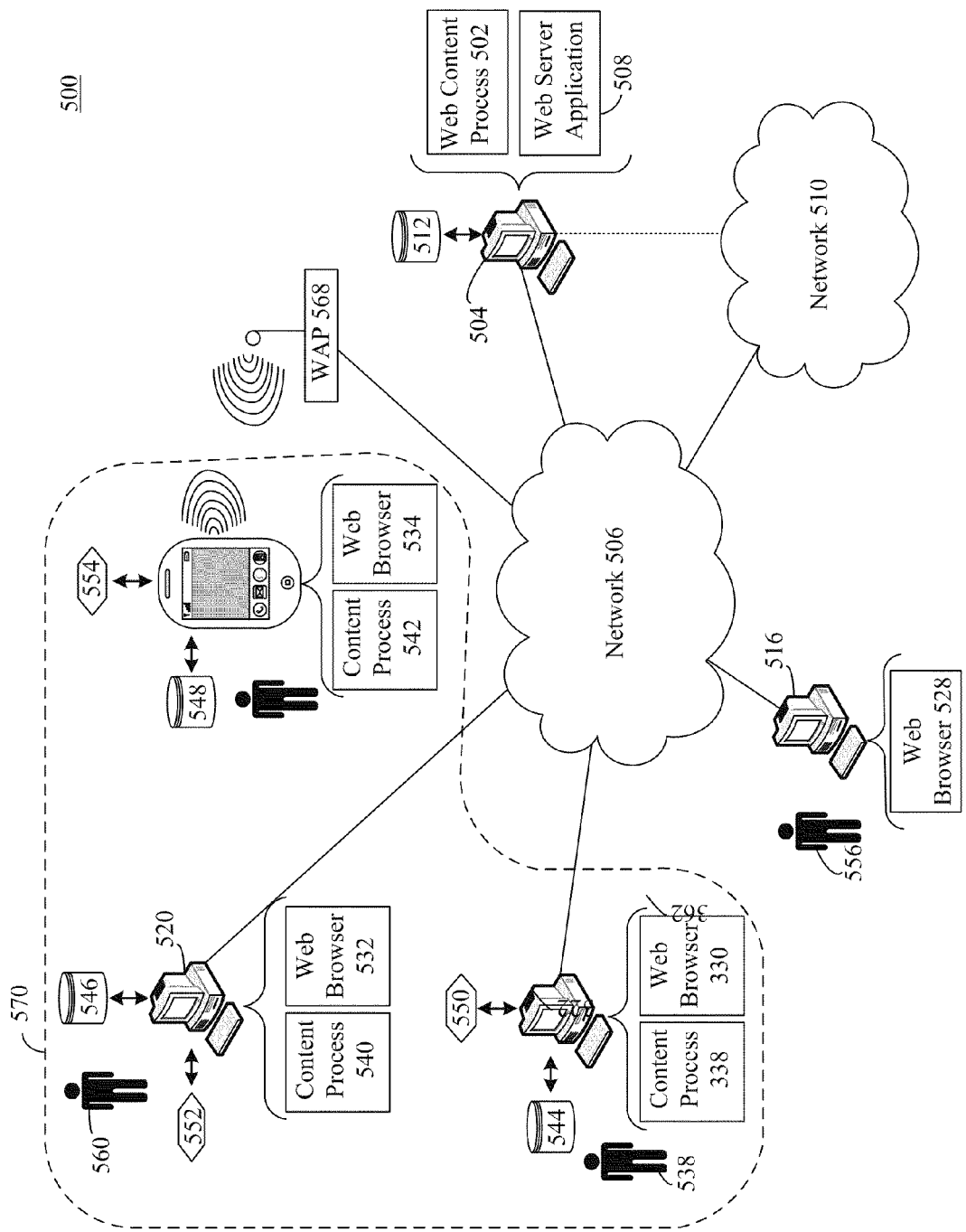
FIG. 5 illustrates a system and architecture for a web content process in accordance with an embodiment of the disclosure.
Figure 6:
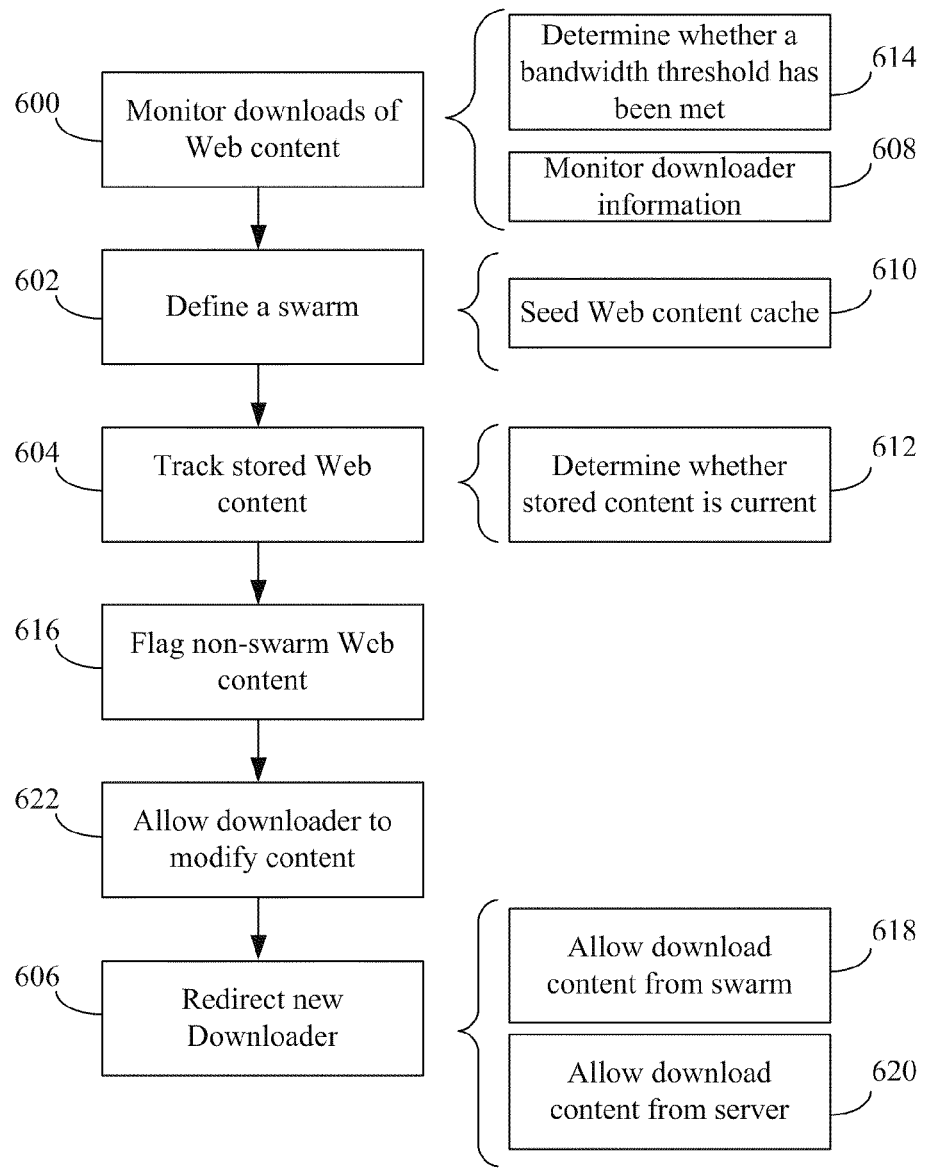
FIG. 6 illustrates a method where web content processes monitor one or more downloads of web content from one or more web content servers in accordance with an embodiment of the disclosure.

In embodiment 206, the Web server 250 itself can be a peer of the peer-to-peer system in which Web cache content is shared. For example, the Web server 250 can function as a centralized server (or server in a structured P2P network). Thus, Web server 650 can include a content indexer 252 and/or a peer group management engine 254. In such an arrangement, the Web server 250 can selectively redirect Web requests, such as redirecting requests to P2P caches when the Web server 250 is in an overload state. Embodiments where the Web server 250 is strongly involved in the P2P network are elaborated upon in FIGS. 5 and 6. It should be emphasized that these embodiments (from FIG. 5 and/or 6) are not intended to limit the scope of the disclosure. Specifics expressed in the embodiments of FIG. 5 and FIG. 6 are, however, applicable in other ones of the embodiments, as will be evident to one of ordinary skill.

Figure 3:
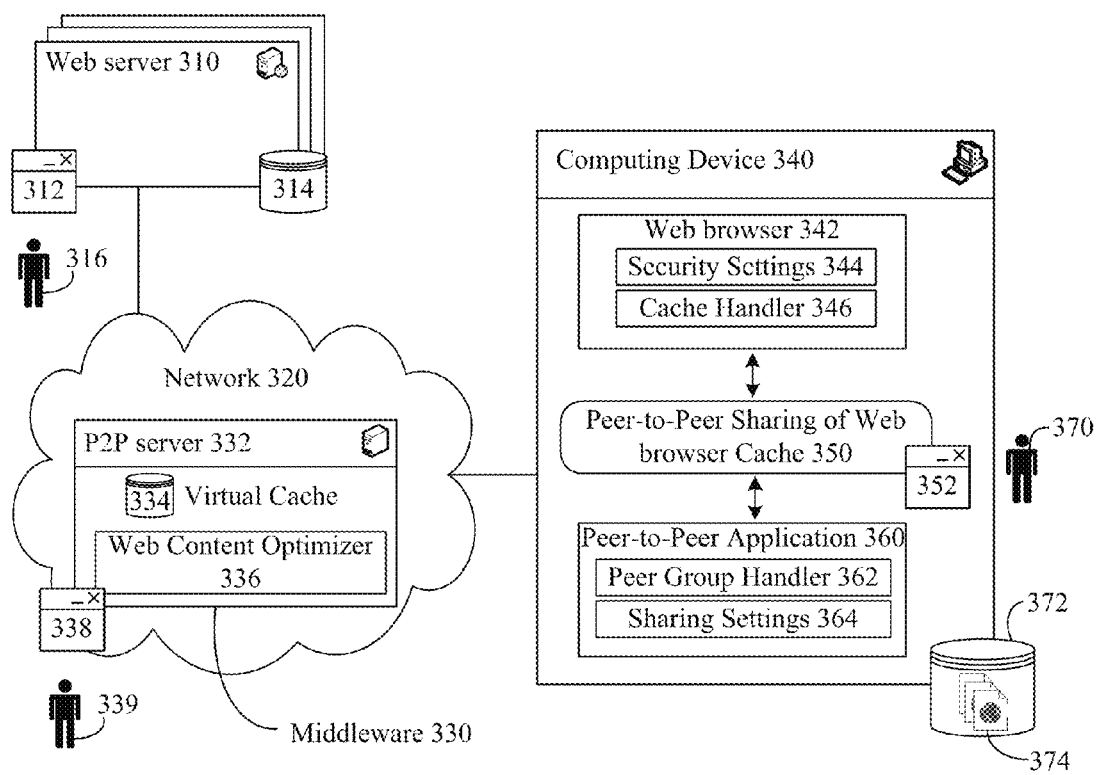
FIG. 3 is a diagram of a system in which Web browser caches are shared using P2P technologies, in accordance with an embodiment of the disclosure.

FIG. 3 is a diagram 300 of a system in which Web browser caches are shared using P2P technologies, in accordance with an embodiment of the disclosure. In system 300, a computing device 340 can be connected to one or more Web servers 310 via a network 320. The network can include a P2P server 332, which facilitates P2P sharing of the Web caches. As previously noted in FIG. 2, not all contemplated embodiments of the disclosure require all components illustrated in diagram 300.

Each Web server 310 can serve content can deliver content to requesting clients, such as client 340 in accordance with Internet standards, such as TCP/IP standards. For example, Web server 310 can respond to the Hypertext Transfer Protocol (HTTP) requests, which includes secure (HTTPS) and insecure requests by providing content items, which are stored in a data store 314. In one embodiment, Web server 310 can be a File Transfer Protocol (FTP) compliant server, which provides files stored on data store 314 in response to requests.

In embodiments where specifics of the Web server 310 affect P2P cache sharing behavior, a user interface 312 can be provided that permits authorized administrators to adjust settings. For example, the Web server 310 can situationally redirect user request to P2P caches based on server load in one contemplated embodiment; where the interface 312 can be used to adjust threshold values for this load. In another embodiment, the Web server 310 can provide real time server metrics to a P2P server 332, which selectively routes requests to either the Web server 310 and/or a P2P cache share based on these server metrics.

The P2P server 332 can represent a centralized server where aspects of a P2P network are managed. For example, the P2P server 332 can index available content from a set of peer groups to create a virtual cache 334. This virtual cache can be a distributed file system consisting of a set of real caches (portions of data store 374) maintained at remote computing devices 340. In another embodiment, the virtual cache 334 can include real storage space, which is used to help improve performance of a P2P network (over using P2P spaces alone). Thus, the virtual cache can include real storage spaces, which enables P2P server 332 to function as a super-node of a P2P network. A Web content optimizer 336 can adjust behavior of the P2P server 332 in accordance with dynamic conditions, such as an availably of content at remote peer caches, a load on the Web server 310, a demand for particular content, and the like.

P2P server 330 can be implemented within middleware 330 in one contemplated embodiment. Further, functionality of P2P server 332 can be provided as a software service, in one embodiment. The P2P server 332 can provide a user interface 338, where configurable settings controlled by the P2P server 332 can be adjusted by an authorized administrator 339. In one embodiment, a unified administrative interface can exist, which permits configuration changes affecting both the Web server 310 and the P2P server 332 from a common screen or set of screens for those administrators (e.g., administrator 316 and/or 339) having suitable privileges.

The computing device 340 can include a Web browser 342, which optionally has security settings 344, a cache handler 346, and other such components that affect behavior of the Web cache 374, which is stored in data store 374.

Additionally, a peer-to-peer application 360 can execute upon the device 340, which includes a peer group handler 362 and a module for adjusting sharing settings 364 relating to the Web cache 374. In one embodiment, the peer-to-peer application 360 can be a stand-alone application capable of operating independent of the Web browser 342. For example, the Peer-to-Peer application 360 can include, for example, LIMEWIRE, FROST WIRE, BIT COMMET, VUZE, UTORRENT, BITTORRENT, ARES GALAXY, and the like. In one embodiment, a plug-in extension can be added to the peer-to-peer application 360, which specifically adds functionality for sharing Web cache data among a set of defined peers. In another contemplated embodiment, the P2P functionality represented by application 360 can be embedded within the Web browser 342. For example, a P2P cache sharing plug-in can be added to Web browser 342 to enable aspects of the disclosure without requiring a separate (or standalone) P2P application 360 to be run on the device 340.

Software module 350 represents a component that integrates behavior of the Web browser 342 with actions of P2P application 360 in order to share Web cache data using P2P techniques. The module 350 can include a user interface 352 through which an authorized end-user 370 can adjust P2P sharing behavior relating to Web cache sharing. In one contemplated embodiment (where the module 350 is tightly integrated with Web browser 342), configuration options represented by interface 352 can be available directly through configuration screens of the Web browser's interface. Module 350 can facilitate low-level interactions between the Web browser 352 and the peer-to-peer application 360. For example, security settings, locations, sizes, retention policies, and the like established within Web browser 342 can be matched to suitable settings of the peer-to-peer application 360 by module 350 to ensure that inconsistencies and inefficiencies are handled.

As shown herein, each of the servers 310, the P2P server 332, and the computing device 340 can include hardware configured to execute software instructions that are stored on a storage medium. The hardware can include, for example, one or more processors, a network interface card (NIC), a volatile memory (e.g., RAM), a non-volatile memory (e.g., hard drive, solid state drive), optional user interface peripherals (keyboard, mouse, printer, display), and the like. Hardware components of each device can be interconnected via a communication bus. The software of the devices (server 310, 332, and device 340) can (but need not) include firmware embedded instructions (e.g., basic input/output system or BIOS), an operating system, and a set of applications running on the operating system. Each of the devices (server 310, 332, and device 340) can represent a set of one or more physical machines that may optionally be functionally treated as virtual machines in diagram 300, as a result of virtualization technologies optionally implemented herein.

Presented data store, including store 314, 334, and 374, can be a physical or virtual storage space configured to store digital information. Data store 140 can be physically implemented within any type of hardware including, but not limited to, a magnetic disk, an optical disk, a semiconductor memory, a digitally encoded plastic memory, a holographic memory, or any other recording medium. The data store 140 can be a stand-alone storage unit as well as a storage unit formed from a plurality of physical devices. Additionally, information can be stored within data stores 314, 334, and/or 374 in a variety of manners. For example, information can be stored within a database structure or can be stored within one or more files of a file storage system, where each file may or may not be indexed for information searching purposes. Further, data stores 314, 334, and/or 374 can utilize one or more encryption mechanisms to protect stored information from unauthorized access.

Network 320 can include any hardware/software/and firmware necessary to convey data encoded within carrier waves. Data can be contained within analog or digital signals and conveyed though data or voice channels. Network 320 can include local components and data pathways necessary for communications to be exchanged among computing device components and between integrated device components and peripheral devices. Network 320 can also include network equipment, such as routers, data lines, hubs, and intermediary servers which together form a data network, such as the Internet. Network 320 can also include circuit-based communication components and mobile communication components, such as telephony switches, modems, cellular communication towers, and the like. Network 320 can include line based and/or wireless communication pathways.

Middleware 320 can refer to a layer of software that exists "in the middle" between application software of device 340 and Web server software 310. Middleware 330 can include a set of services that allows multiple processes running on one or more machines to interact. This technology evolved to provide for interoperability in support of the move to coherent distributed architectures, which are most often used to support and simplify complex distributed applications. It includes web servers, application servers, and similar tools that support application development and delivery. Middleware 330 is especially integral to modern information technology based on XML, SOAP, Web services, and service-oriented architectures. In one embodiment, the middleware 330 can be implemented within a J2EE application server. Further, the middleware 330 can represent a WEBSPHERE based implementation in one contemplated embodiment.

Figure 4:
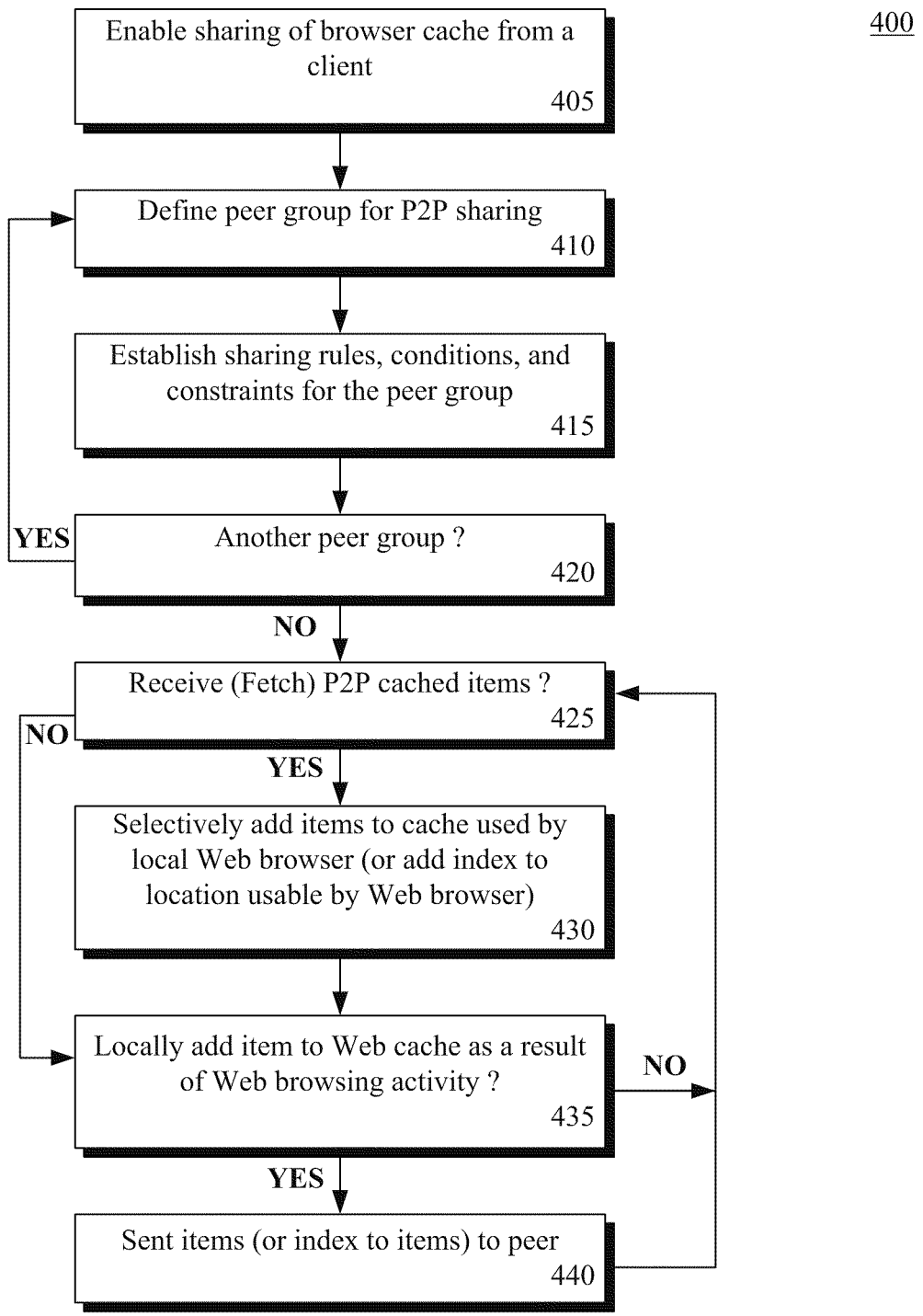
FIG. 4 shows a flow chart for a method for sharing a Web cache using P2P technologies in accordance with an embodiment of the disclosure.

FIG. 4 shows a flow chart for a method 400 for sharing a Web cache using P2P technologies in accordance with an embodiment of the disclosure.

Method 400 can begin in step 405, where a user can enable browser cache sharing. This can be through an option established from within a Web browser interface, from within a P2P application interface, and/or through a plug-in extension interface depending on implementation specifics. In step 410, one or more peer groups should be defined for the P2P sharing. Sharing rules, conditions, constraints, and other settings can be established for the peer group, as shown by step 415. If another peer group is to be added, the method can proceed from step 420 to step 410, else it can proceed to step 425.

In step 425, P2P cached items can be received (or retrieved) from one or more clients of an active peer group. In one embodiment, a set of content items can be conveyed at a time. In step 430, the received items can be selectively added so that they are able to be used by the Web browser.

For example, the items can be directed added to a local cache in one embodiment. In another embodiment, a special P2P sharing cache can exist, which represents a subset of total cached items that are shared among the peer group (i.e., additional cache items can be used locally, which are not shared). In one embodiment, an indexing system can be implemented so that the actual content of items is not stored in a local cache, but a reference (e.g., a hyperlink) to the information is stored locally. In this case, use of a remotely cached Web content item will require retrieval from a peer-cache, at the time the information is needed. Decisions for retrieval of P2P shared content can be made at the local device level, at a P2P server (such as one implemented in middleware) or at a Web server (i.e., which redirects requestors to use a P2P cache when the server load is over a designated threshold) depending on implementation choices. Similarly, prefetching (from P2P caches) can be selectively performed based on projected or predicted content needs, while other content (not anticipated as needed) can be indexed to a P2P source.

Regardless of specifics used to retrieve shared content within a Peer Group, step 435 can execute when local browsing activity results in new content being added to a Web cache. This step (435) can be alternatively triggered when content is added to a local Web cache using P2P sharing (as opposed to user-directed activity). When there is new content in the Web cache, the method can proceed to step 440, else it can repeat step 425. In step 440, new items can be shared with other peers as appropriate. This sharing can physically transfer a set of items to requesting peers, can send indexes to the items to peers (or to a centralized server), or can push items to a set of peers in the peer group, depending on implementation specifics. After step 440, step 425 can be repeated.

Turning to FIG. 5, it illustrates a system and architecture 500 for a web content process in accordance with an embodiment of the disclosure. In architecture 500, a Web content process 502 may reside on and may be executed by server computer 504, which may be connected to network 506 (e.g., the Internet or a local area network). Examples of server computer 504 may include, but are not limited to: a personal computer, a server computer, a series of server computers, a mini computer, and a mainframe computer. As will be discussed below in greater detail, web content service 502 may monitor, track, and/or redirect web content requests. In addition, as an alternative, the web content process 502 may reside on and may be executed by one or more client electronic devices, such as a personal computer, notebook computer, personal digital assistant, and data enabled cellular phone, for example.

Server computer 504 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both).

Additionally, server computer 504 may run a web server application, such as web server application 508, examples of which may include but are not limited to: Microsoft, Novell Webserver", or Apache® Webserver, that allows for HTTP (i.e., HyperText Transfer Protocol) access to server computer 504 via network 506 and/or network 510 (Webserver is a trademark of Novell Corporation in the United States, other countries, or both; and Apache is a registered trademark of Apache Software Foundation in the United States, other countries, or both). Web content process 502 may be a standalone application or may be an applet/application that runs within and/or interfaces with web server application 508. In further embodiments, web content process 502 may reside on a separate computing device from web server application.

The instruction sets and subroutines of web content process 502, which may be configured as one or more software modules, and web server application 508, which may be stored on storage device 512 coupled to server computer 504, may be executed by one or more processors (not shown) and one or more memory architectures (not shown) incorporated into server computer 504. Storage device 512 may include but is not limited to: a hard disk drive; a solid state drive; a tape drive; an optical drive; a RAID array; a random access memory (RAM); and a read-only memory (ROM).

Various computing devices, including but not limited to desktop computer 316, desktop computer 518, laptop computer 520, and/or personal computing device 322, may interact with server computer 504 via network 506. Network 506 may be connected to one or more secondary networks (e.g., network 510), examples of which may include but are not limited to: a local area network; a wide area network; or an intranet, for example. The aforementioned various computing devices may execute network operating systems including, but not limited to: Microsoft Windows and Red Hat Linux. The various computing devices may also execute other applications and/or services.

Desktop computer 516, desktop computer 518, laptop computer 520, and personal computing device 522 may execute web browsers 528, 530, 532, and 534, respectively. Examples of web browsers 528, 530, 532, 534 include, but are not limited to Microsoft Internet Explorer®, Mozilla® Firefox®, and Opera Software® web browsers (Internet Explorer is a registered trademark of Microsoft Corporation in the United States, other countries, or both; Mozilla is a registered trademark of Mozilla Foundation Corporation in the United States, other countries, or both; Firefox is a registered trademark of Mozilla Foundation Corporation in the United States, other countries, or both; and Opera Software is a registered trademark of Opera Software AS. Corporation in the United States, other countries, or both). Additionally or alternatively, desktop computer 518, laptop computer 520 and personal computing device 522 may execute cached content process 538, cached content process 540, and cached content process 542, respectively. The instruction sets and subroutines of web browsers 530, 532, 534 and cached content processes 538, 540, 542 may be stored on storage devices 544, 546, 548, which may be coupled to desktop computer 518, laptop computer 520, and personal computing device 522, respectively. Cached content processes 538, 540, 542 may be stand-alone applications, services, applets, plug-ins, and/or any other form of executable software. Storage devices 544, 546, 548 may include but are not limited to: a hard disk drive; a solid state drive; a tape drive; an optical drive; a RAID array; a random access memory (RAM); and a read-only memory (ROM). As will be discussed in greater detail, cached content processes 538, 540, 542 may receive requests for cached content.

Web content caches 550, 552, 554 (e.g., which may be provided by web browsers 530, 532, 534 and/or cached content processes 538, 540, 542) may also reside on desktop computer 518, laptop computer 520 and personal computing device 522, respectively. As will be discussed, web content caches 550, 552, 554 may contain cached web content (i.e., stored web content), including web content received from one server computer 504 (e.g., via web server application 508). Web content caches may 550, 552, 554 may be stored on storage devices 544, 546, 548, respectively.

Users, e.g., users 556, 558, 560, 562, may request web content (e.g., via one or more of web browsers 528, 530, 532, 534 and/or cached content processes 538, 540, 542) from server computer 504 directly through network 506 or through secondary network 510. Further, server computer 504 (i.e., the computer that executes web content process 502) may be connected to network 506 through secondary network 510, as illustrated with phantom link line 564.

Server computer 504 and the various computing devices shown in FIG. 5 (e.g., desktop computer 516, desktop computer 518, laptop computer 520, and personal computing device 522), as well as other computing devices, may be directly or indirectly coupled to network 506 (or network 510). For example, personal computing device 522 is shown wirelessly coupled to network 506 via wireless communication channel 566 established between personal computing device 522 and a wireless access point (i.e., WAP) 568, directly coupled to network 506. WAP 568 may be, for example, an IEEE 802.1 la, 802.1 lb, 802.1 lg, 802.1 ln Wi-Fi, and/or Bluetooth device that is capable of establishing wireless communication channel 566 between personal computing device 522 and WAP 568. Further, server computer 504 is shown directly coupled to network 506 via a hardwired network connection.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

As mentioned, computing devices including server computer 504, desktop computer 516, desktop computer 518, laptop computer 520, and personal computing device 522 may each execute an operating system, examples of which may include but are not limited to Microsoft Windows, Microsoft Windows CE®, Red Hat Linux, or a custom operating system (Windows CE is a registered trademark of Microsoft Corporation in the United States, other countries, or both).

For purposes of illustration, the following discussion will refer to web desktop computer 516 as a new downloader of the web content and to desktop computer 518, laptop computer 520, and personal computing device 522 as previous downloaders of the web content. However, this should not be construed as a limitation of this disclosure, as other computing devices may be new downloaders and previous downloaders.

Referring also to FIG. 6, web content processes 502 may monitor 600 one or more downloads of web content (e.g., which may be stored on storage device 512) from one or more web content servers. A swarm may be defined 602, in which the swarm includes one or more previous downloaders of the web content from the one or more web content servers. One or more of the previous downloaders may include one or more web content caches. At least a portion of the downloaded web content may be included in the one or more web content caches. Web content process may track 604 stored web content included within the one or more web content caches of the swarm. Further, web content process 502 may redirect 606 a new downloader of the one or more web content servers to the one or more web content caches of the swarm. For example, instead of handling all web content requests directly, web content process 502 may redirect 606 web content requests to other computing devices which have previously downloaded the web content, in which at least a portion of the downloaded web content is stored within a web content cache. These other computing devices may have copies of the web content in a cache and may be able to process the web content request by serving out the copies of the web content.

Web content process 502 may monitor 600 downloads of web content from server computer 504 (e.g., via web server application 508). Server computer 504 may execute web server application 508 that may make web content available for download via network 506 (or network 510). For example, one or more user (e.g., user 558, user 560, user 562) may each access web server application 508 (e.g., using desktop computer 518, laptop computer 520, and personal computing device 522 via web browser 530, 532, 134 respectively) via network 506 (or network 510) and may request web content from web server application 508. Web content process 502 may monitor 600 one or more requests for web content and may also monitor 600 one or more downloads of web content from server computer 504. In a further example, downloads of web content from server computer 504 may be monitored 600 by a third party, e.g., which may monitor traffic associated with a website capable of accessing the web content. In such an example, web content process 502 may receive information regarding downloads of the web content, e.g., as a web service, from the third party.

Monitoring 600 the one or more downloads of web content from server computer 504 (e.g., from web server application 508) may include monitoring 608 downloader information. For example, when a request for web content is received (e.g., by web content process 502 and/or web server application 508), web content 502 may monitor 608 (e.g., and store or otherwise log) the identity of the downloader (e.g., desktop computer 518, laptop computer 520, and/or personal computing device 522), the nature of the downloaded web content (e.g., the one or more webpages and/or features of one or more webpages downloaded by one or more of desktop computer 518, laptop computer 520, and/or personal computing device 522). The monitored 608 downloader information may include various additional and/or alternative information, including, but not limited to: the frequency of the requests, the size of web content requested, the location of the web content requested, the type of web content requested, the number of computing devices requesting web content, the location of the computing devices requesting web content, the address of computing devices requesting web content, bandwidth capabilities of the downloader (e.g., desktop computer 518, laptop computer 520, and/or personal computing device 522), information about the web browser (e.g., web browser 530, 532, 534) of the downloader, the presence of a cached content process (e.g., cached content process 538, 540, 542) or any other information about the web content requests.

Web content process 502 may define 602 a swarm (e.g., swarm 570) including one or more previous downloaders of the web content from the one or more web content servers (e.g., web server 504 executing web server application 508).

Continuing with the above-stated example, desktop computer 518, laptop computer 520, and personal computing device 522 may download web content from server computer 504 (e.g., from web server application 508). Each of desktop computer 518, laptop computer 520, and personal computing device 522 may each include one or more web content caches (e.g., web content caches 550, 552, 554, provided by one or more of web browsers 530, 532, 534 and/or cached content processes 538, 540, 542, respectively). The one or more web content caches of desktop computer 518, laptop computer 520, and personal computing device 522 may include (e.g., may store) at least a portion of the downloaded web content.

Consistent with the foregoing, swarm 570 defined 602 by web content process 502 may include a group of one or more computing devices (e.g., desktop computer 518, laptop computer 520, and personal computing device 522) that have previously downloaded web content from server computer 504. The computing devices may also retain at least a partial copy of the downloaded web content in one or more content caches. For example, user 560 may request web content (i.e. web pages, HTML files, XML files, gif or jpg images, media files, etc.) from server computer 504. User 560 may download and view the web content via laptop computer 520 and web browser 532. Web browser 532 (alone or in conjunction with cached content process 540, e.g., which may include an applet or application downloaded to laptop computer 520 by web content process 502) may retain a copy of at least a portion of the web content in a web content cache (e.g., web content cache 552), for example. As such, at least a portion of the downloaded web content may be stored in the one or more web content caches.

Additionally, defining 602 the swarm may include seeding one or more of the web content caches with web content. For example, in addition to web content downloaded by a computing device (e.g., desktop computer 518, laptop computer 520, and/or personal computing device 522), web content process 502 may seed 610 one or more web content caches (e.g., web content caches 550, 552, 554) with web content. Seeding 610 one or more web content cache may include downloading web content to the one or more web content caches, e.g., which may be in addition to web content requested by a user (e.g., user 558, 560, 562) via a web browser (e.g., web browser 530, 532, 534).

Users 558, 560, 562 may be remunerated for receiving and/or subsequently allowing access to seeded content. Remuneration may include, for example, direct payment, goods or services (e.g., such as credit towards downloads, such as media downloads from music download services), the right of the seeded user to insert ads into the web content, etc.

Continuing with the above-stated example, a user (e.g., user 558) may request a web page from web server application 508 via web browser 530. Web server application 508 may allow the requested web page to be downloaded to desktop computer 518 (e.g., via web browser 530). Additionally, web content process 502 may include additional web content (e.g., corresponding to another web page, features of a web page, and/or other web content) with the requested web content. The additional web content may be stored (e.g., by one or more of web browser 530 and cached content process 538) in web content cache 550, for example. In addition to including the additional web content with requested web content, web content process 502 may seed 610 the one or more web content caches (e.g., web content caches 550, 552, 554) with web content by pushing the web content to the one or more downloaders (e.g., desktop computer 518, laptop computer 520, and/or personal computing device 522) via one or more of a web browser (e.g., web browser 530, 532, 534) and/or a cached content process (e.g., cached content processes 538, 540, 542). As such, seeding 610 one or more web content caches with the web content may result in the web content being stored in the one or more web content caches.

Web process 502 may track 604 stored web content within the one or more web content caches (e.g., web content caches 550, 552, 554) of swarm 570 (e.g., which may include desktop computer 518, laptop computer 520, and personal computing device 522, in the foregoing example). Tracking 604 stored web content within the one or more web content caches of swarm 570 may include, for example, storing a log of the web content that has been downloaded from server computer 504 and the identity, address, or the like, of the downloader (e.g., desktop computer 518, laptop computer 520, and personal computing device 522). For example, user 562 may request web content from server computer 504 via personal computing device 522 and/or web browser 534. Web process 502 may track 604 the web content (e.g., which may include one or more web pages, items within a web page, or the like) downloaded to personal computing device 522 (e.g., which may be stored in web content cache 554). Continuing with the above-stated example, in one embodiment, web process 502 may communicate with cached content process 542 to track 604 stored web content within web content cache 554 of personal computing device 522. In another embodiment, web process 502 may track 604 stored web content within web content cache 554 based upon, at least in part, retained information about the web content downloaded by personal computing device 522 (e.g., based upon, at least in part, an identity and/or address of personal computing device 522 and the web content downloaded to personal computing device 522). Many and various methods of tracking 604 the contents of a web content cache may additionally/alternatively be employed.

Tracking 604 stored web content may also include determining 612 whether the web contents within a web content cache are current. Continuing with the above-stated example, in which web content has been downloaded to personal computing device 522 (e.g., via web browser 534) and at least a portion of the web content is stored in web content cache 554, web content process 502 may determine if the at least a portion of the web content stored in web content cache corresponds to the current state of the web content (e.g., which may reside on storage device 512 of server computer 504 and may be available for download via web server application 508). Web content process 502 may determine 612 whether the web content stored within web content cache 554 is current, for example, based upon, at least in part, whether the web content has been changed (e.g., updated) since it was downloaded by personal computing device 522. For example, based upon monitored 608 downloader information, web content process 502 may know when the web content was downloaded by personal computing device 522. Additionally, web content process 502 may maintain a log of changes to the web content available for download via web server application 508.

Based upon, at least in part, when the web content was downloaded by personal computing device 522 and based upon, at least in part, whether the web content available for download via web server application 508 has been changed since the web content was downloaded by personal computing device 522, web content process 502 may determine 612 whether the web content stored within web cache 554 is current. Various additional/alternative mechanisms may be employed for determining 612 if the web content stored within the one or more web content caches is current, including for example, web content process 502 polling the one or more web content caches, e.g., via a web browser and/or cached content process respectively associated with the one or more web content caches.

Web content process 502 may redirect 606 a new downloader of the one or more web content servers to the one or more content caches of the swarm. For example, if a user (e.g., user 556) may request download of web content from server computer 504 using desktop computer 516 (e.g., a new downloader) using web browser 528. Web content process 502 may redirect 606 web browser 528 (e.g., executed by the new downloader desktop computer 516) to one or more of web content caches 550, 552, 554 of swarm 570. Web browser 528 may accordingly, download at least a portion of the requested web content from one or more of web content caches 550, 552, 554 (e.g., web browser 528 may download at least a portion of the web content from one web content cache, and/or may download different portions of the web content from different ones of the web content caches). Web content process 502 may provide remuneration for allowing access to web content from the one or more web content caches of the swarm. For example, web content process 502 may remunerate users 558, 560, 562 for allowing access to web content stored in web content caches 550, 552, 554. Remuneration may include, for example, direct payment, goods or services (e.g., such as credit towards downloads, such as media downloads from music download services), the right of the seeded user to insert ads into the web content, etc.

According to an embodiment, web content process 502 may redirect 606 a new downloader of the web content to one or more web content caches, for example, as a mechanism for managing bandwidth capabilities of server computer 504 and/or network 506 or network 510. For example, in the event of a relatively high volume of web content download requests, server computer 504, web server application 508, network 506 and/or network 510 may not be capable of reasonably satisfying all of the download requests without exhibiting degraded performance. In such a situation, web content process 502 may redirect 606 at least a portion of new downloaders of the web content to one or more of the web content caches (e.g., web content caches 550, 552, 554). As such, web content may be provided to one or more new downloaders during times of relatively high volume web content requests without the need to maintain hardware, software, and bandwidth capabilities necessary to accommodate such relatively high volumes of web content requests.

As stated above, web content process 502 may monitor 600 the one or more downloads of the web content. Monitoring 600 the one or more downloads of the web content may include determining 614 whether a bandwidth threshold has been met. The bandwidth threshold may be a bandwidth requirement necessary to satisfy download requests, which cannot be met without realizing an unsatisfactory degradation of web content download performance. If web content process 502 determines 614 that a bandwidth threshold has been met (i.e., that server computer 504 and/or web server application 508 cannot meet web content requests without realizing the unsatisfactory degradation of web content download performance), web content process 502 may redirect 606 at least a portion of new downloaders of the web content to one or more of the web content caches.

In a similar manner, other sources for web traffic prediction may be utilized. For example, a website hosted by web server application 508 may be listed in a recent entry on a social content site, news aggregation site or the like (such as www-.digg.com or www.reddit.com). As such, there may be an increased chance that the website hosted by web server application 508 may soon experience increased traffic. In response to such a forecast of web traffic, web content process 502 may begin redirecting 606 at least a portion of new downloaders of the web content to one or more of the web content caches.

As discussed, the web content caches of the computing devices of swarm 570 may contain copies of at least a portion of the web content. For example, desktop computer 518, laptop computer 520, and personal computing device 522 each may have downloaded web content (e.g., one or more web pages, portions of web pages, and/or one or more portions of web pages) from server computer 504. Instead of handling subsequent web content download requests (i.e., web content requests from new downloaders) itself, server computer 504 and/or web content process 502 may redirect 606 the new content downloader (e.g., desktop computer 516) to receive the web content from one or more of web content caches 550, 552, and/or 554. For example, if user 556 requests web content from server computer 504 via desktop computer 516, server computer 504 may redirect 606 desktop computer 516 to receive at least a portion of the web content from one or more of web content cache 550, 552, and/or 554 associated with desktop computer 518, laptop computer 520, and personal computing device 522, respectively. One or more of cached content processes 538, 540, and/or 542 may then supply at least a portion of the web content to desktop computer 516. Desktop computer 516 may then receive at least a portion of the web content, not from server computer 504, but rather from one or more of desktop computer 518, laptop computer 520, and/or personal computing device 522. More generally, web content process 502 may redirect 606 a new content downloader to any and/or all computing devices within swarm 570, and the new content downloader may receive at least a portion of the web content from any and/or all computing devices within swarm 570.

Web content process 502 may redirect 606 a new web content downloader to receive web content from one previous downloader (e.g., desk top computer 518) within swarm 570, from all previous downloaders (e.g., desktop computer 518, laptop computer 520, and personal computing device 522) within swarm 570, or from any combination of previous downloaders (e.g., at least a portion from desktop computer 518 and at least a portion from personal computing device 522) within swarm 570. Additionally, web content process 502 may redirect 606 various new content downloaders to receive web content from different previous downloader, thus distributing the requests among more than one previous downloader.

For example, if a web site (e.g., which may be hosted by server computer 504 and web server application 508) has multiple pages, and if the multiple pages are resident on multiple web content caches (e.g., web content caches 550, 552, 554) within swarm 570, web content process 502 may redirect 606 a new downloader of web content to request a first web page from a first web content cache, a second web page from a second web content cache, a third web page from a third web content cache, etc.

Redirecting 606 the new downloader of the one or more web content servers may include redirecting 606 a first new downloader (e.g., desktop computer 516) to the stored web content within one or more first web content caches (e.g., web content cache 550 of desktop computer 518) of swarm 570. Further, web content process 502 may redirect 606 a second new downloader (e.g., personal computing device 522, which may be a new downloader in addition to being a previous downloader) to the stored web content within one or more second web content caches (e.g., web content cache 552 of laptop computer 520) of swarm 570. As such, web content process may load balance access requests to the one or more web content caches of swarm 570.

Web content process 502 may flag 616 at least a portion of the web content residing on the web content server (e.g., server computer 504) as non-swarm content. If a new downloader requests non-swarm web content, web content process 502 may refrain from redirecting 606 the new downloader to web content caches within swarm 570. For example, server computer 504 may contain a blog web site. The blog website may include relatively static blog entries that may not change frequently, and relatively dynamic blog comments that do change frequently. Web content process 502 may flag 616 some of the blog web site content (e.g., the relatively dynamic blog comments) as non-swarm content. Accordingly, web content process 502 may redirect 606 a new downloader (e.g., desktop computer 516) to one or more web content caches (e.g., web content caches 550, 552, 554) and allow 618 desktop computer 516 to download blog entries from swarm 570 (e.g., retrieve blog entries from one or more of web content caches 550, 552, 554). Similarly, web content process 502 may not redirect desktop computer 516 to swarm 570 for downloading flagged 618 content (e.g., blog comments), but rather may allow 620 the new downloader (e.g., desktop computer 516) to download blog comments from server computer 504 (e.g., via web server application 508).

Web content process 502 (alone or in conjunction with one or more of cached content processes 538, 540, 542) may allow 622 a previous downloader (e.g., desktop computer 518, laptop computer 520, personal computing device 522) of the web content to modify at least part of the content within the one or more web content cache of the one or more previous downloaders (e.g., one or more of web content caches 550, 552, 554 of desktop computer 518, laptop computer 520, and personal computer device 522, respectively). For example, web content process 502 may allow 622 user 558 to modify previously downloaded web content (e.g., which may be stored in web content cache 550 associated with previous downloader desktop computer 518), e.g., by inserting an advertisement into the web content, adding content, removing content or the like. Web content process 502 may redirect 606 a new downloader (e.g., desktop computer 516) to download requested web content from web content cache 550. As such, when desktop computer 516 downloads (e.g., using web browser 528) the web content from web content cache 550, desktop computer 516 may download the modified web content.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
   establishing a peer group for sharing Web cache data among a set of computing devices through a peer-to-peer network, where each of the computing devices is referred to a peer of the peer-to-peer network, wherein the Web cache data comprises dynamic content that is continuously updated based on user activities using a Web browser, where the Web cache data is used by each of the computing devices to respond to requests issued over a client-server network from the Web browser running on that computing device, wherein each of said requests are issued from the computing devices to a plurality of Web servers using a client-server protocol;

determining whether bandwidth capabilities of a connection between the computing device and the Web server prevent the Web server from being not capable of satisfying current requests, which include the client request, without exhibiting degraded performance;

when the bandwidth capabilities of the Web server are capable of satisfying current requests, which include the client request, without exhibiting degraded performance, responding to the client request using data from the Web server;

when bandwidth capabilities of the Web server are not capable of satisfying current requests, which include the client request, without exhibiting degraded performance,
  (i) redirecting the client request to a computing device among the set of computing devices in the peer-to-peer network for responding to the client request using Web cache data that is saved in a repository of one of the computing device and not responding to the client request using data from the Web server; and
  (ii) exchanging Web cache data among the peers of the peer group via the peer-to-peer network; and
  (iii) satisfying a client request issued from a Web browser of one of the computing devices using Web cache data obtained from a different one of the computing devices in the peer group through the peer-to-peer network, wherein the client request is a request to one Web server of the plurality of Web servers for Web content, and wherein the Web server associated with the client request never provides the Web content responsive to the client request, which is obtained instead from the different one of the computing devices.

2. The method of claim 1, wherein the client request is one of a Hypertext Transfer Protocol (HTTP) or Hypertext Transfer Protocol Secure (HTTPS) request, and wherein the different one of the computing devices is not referenced or explicitly indicated in the client request.

3. The method of claim 1, when bandwidth capabilities of the Web server are not capable of satisfying current requests without exhibiting degraded performance, the client request is satisfied without one of the plurality of the Web servers ever receiving the client request.

4. The method of claim 1, when bandwidth capabilities of the Web server are capable of satisfying current requests without exhibiting degraded performance resulting in the client request being satisfied by one of the plurality of the Web servers, redirecting the client to the different one of the computing devices.

5. The method of claim 1, further comprising:
  indexing at a centralized peer-to-peer server, Web content data available within of the peer group via the peer-to-peer network;
  the centralized peer-to-peer server receiving the client request and responsively querying the Web content data capable of satisfying the client request;
  when Web content data capable of satisfying the client request is discovered by the centralized peer-to-peer server and when the bandwidth capabilities of the Web server are not capable of satisfying current requests without exhibiting degraded performance, directing the client request to the different one of the computing devices, which is a computing device that the centralized peer-to-peer server has determined is sharing the Web content data capable of satisfying the client request; and
  when Web content data capable of satisfying the client request is not discovered by the centralized peer-to-peer server and when the bandwidth capabilities of the Web server are not capable of satisfying current requests without exhibiting degraded performance, directing the client request to one of the plurality of Web servers.

6. The method of claim 1, wherein the Web cache data that satisfies the client request comprises advertising that has been inserted into the Web cache data by a node of the peer-to-peer network, wherein one of the plurality of Web servers that originally provided the Web cache data to one of the computing devices of the peer-to-peer network did not authorize or insert the advertising.

7. The method of claim 1, wherein one of the plurality of Web servers that received the client request is not a peer of the peer-to-peer network, and wherein the peer-to-peer network is an unstructured network lacking a centralized server.

8. A method comprising:
  monitoring one or more downloads of Web content from one or more Web content servers, wherein each of the one or more downloads occurs via a client-server request from a Web browser of one of a set of at least two client computing devices and via receiving a corresponding response from one of the Web content servers;
  storing the one or more downloads of the Web content within Web browser caches of the set of at least two client computing devices comprising a first client computing device and a second client computing device;
  tracking, at each of the client computing devices, the storage of the one or more downloads of the Web content within Web browser caches of the set of client computing devices;
  establishing a peer group of a peer-to-peer network, which includes the set of client computing devices;
  sharing a Web browser cache of the first computing device with the second client computing device via the peer-to-peer network, wherein Web content in the shared Web browser cache of the first client computing devices is directly accessible to Web browser of the second client computing device;
  determining whether bandwidth capabilities of a connection between the computing device originating the client-server request and the Web content servers prevent the Web content server from being not capable of satisfying current requests, which include the client-server request, without exhibiting degraded performance;
  when the bandwidth capabilities of the Web content servers are capable of satisfying current requests, which include the client-server request, without exhibiting degraded performance, responding to the client-server request using data from the Web content servers; and
  when bandwidth capabilities of the Web content servers are not capable of satisfying current requests, which include the client-server request, without exhibiting degraded performance, satisfying the client-server request directed to one of the Web content servers utilizing Web content obtained from the shared Web browser cache of the first client computing device via the peer-to-peer network, wherein the client-server request is from the second computing device to one of the Web content servers.

9. The method of claim 8, wherein the Web content servers are peers of the peer-to-peer network, and wherein the Web content servers selectively redirect download requests from issued via a client-server message to Web content able to be obtained from the Web browser caches via the peer-to-peer network.

10. The method of claim 8, wherein the Web content servers are not peers of the peer-to-peer network, and wherein the Web content servers never receive download requests issued from the computing devices that are satisfied utilizing Web content obtained from the Web browser caches via the peer-to-peer network.

11. The method of claim 8, wherein the satisfied download requests are each a Hypertext Transfer Protocol (HTTP) or a Hypertext Transfer Protocol Secure (HTTPS) request, and wherein for each of the download requests the computing device that provided the Web content that satisfied the download requests is not referenced or explicitly indicated in the client request.

12. The method of claim 8, wherein sharing of the web cache is controllable according to user selectable browsing modes.

13. The method of claim 8, wherein the sharing is automatically triggered based on a set of definable factors.

14. A method comprising:
maintaining a Web content cache at a client device, which comprises cached data from Web browser activities performed between the client device and a set of Web servers, wherein the Web cache data is continuously being updated based on the Web browser activities performed between the client device and the set of Web servers, and wherein the cached data is able to be utilized by the Web browser to respond to subsequent Web browser requests issued to one of the set of Web servers without having to obtain new data from any of the Web servers, as the subsequent responses are able to be handled by retrieving cached data from the Web content cache;
establishing a peer group of a peer-to-peer network, which includes the client device and a set of remotely located client devices;
sending at least a portion of the cached data from the client device to at least one of the remotely located client devices via the peer-to-peer network, wherein the remotely located client devices are able to utilize the cached data to handle Web browser requests issued from these remotely located client devices to the Web servers without having to obtain new data from any of the Web servers when bandwidth capabilities of the Web servers are not capable of satisfying current requests without exhibiting degraded performance; and
receiving peer-shared cached data from the remotely located client devices via the peer-to-peer network, wherein the peer-shared cached data is able to be utilized by the Web browser to respond to subsequent Web browser requests issued to one of the set of Web servers when bandwidth capabilities of the Web server are not capable of satisfying current requests without exhibiting degraded performance without having to obtain new data from any of the Web servers; and
when the bandwidth capabilities of the Web servers are capable of satisfying current requests without exhibiting degraded performance, responding to the current requests using data from the Web servers.

15. The method of claim 14, further comprising maintaining the Web content cache at the client device comprises:
partitioning the Web content cache into the plurality of sections, wherein the plurality of sections comprises at least a shared section and an unshared section;
downloading Web content from the set of Web servers based on performing the Web browser activities between the client device and the set of Web servers;
selectively placing the Web content as cached data into one of the shared section and the unshared section.

16. The method of claim 14, wherein peer-shared cached data provided to the computing device from the remotely located client devices via the peer-to-peer network is continuously being updated responsive to Web browsing activities performed on any of the remotely located client devices, wherein the peer-shared cached data comprises advertisements that were not inserted or authorized by any of the set of Web servers.

17. A computer program product comprising:
a non-transitory computer usable medium having computer usable program code embodied therewith, the computer usable program code comprising:
computer usable program code configured to establish a peer group for sharing Web cache data among a set of computing devices through a peer-to-peer network, where each of the computing devices is referred to as a peer of the peer-to-peer network, wherein the Web cache data is a dynamic content that is continuously updated based on user activities on Internet, where the Web cache data is used by each of the computing devices to respond to requests issued over a client-server network from a Web browser running on that computing devices, wherein each of said requests are issued from the computing devices to a plurality of Web servers using a client-server protocol;
computer usable program code configured to determine whether bandwidth capabilities of a connection between the computing device and the Web server prevent the Web server from being not capable of satisfying current requests, which include the client request, without exhibiting degraded performance;
computer usable program code configured to, when the bandwidth capabilities of the Web server are capable of satisfying current requests, which include the client request, without exhibiting degraded performance, respond to the client request using data from the Web server; and
computer usable program code configured to, when bandwidth capabilities of the Web server are not capable of satisfying current requests, which include the client request, without exhibiting degraded performance,
(i) redirect the client request to a computing device among the set of computing devices in the peer-to-peer network for responding to the client request using Web cache data that is saved in a repository of one of the computing device and not responding to the client request using data from the Web server;
(ii) exchange Web cache data among the peers of the peer group via the peer-to-peer network; and
(iii) satisfy client request issued from a Web browser of one of the computing devices using Web cache data obtained from a different one of the computing devices in the peer group through the peer-to-peer network, wherein the client request is a request to one Web server of the plurality of Web servers for Web content, and wherein the Web server associated with the client request never provides the Web content responsive to the client request, which is obtained instead from the different one of the computing devices.

18. The computer program product of claim 17, wherein the client request is one of a Hypertext Transfer Protocol (HTTP) or Hypertext Transfer Protocol Secure (HTTPS) request, and wherein the different one of the computing devices is not referenced or explicitly indicated in the client request.

19. The computer program product of claim 17, further comprising:
- computer usable program code configured to index at a centralized peer-to-peer server, Web content data available within of the peer group via the peer-to-peer network;
- computer usable program code configured to, at the centralized peer-to-peer server, receive the client request and responsively querying the Web content data capable of satisfying the client request;
- computer usable program code configured to, when Web content data capable of satisfying the client request is discovered by the centralized peer-to-peer server and when the bandwidth capabilities of the Web server are not capable of satisfying current requests without exhibiting degraded performance, direct the client request to the different one of the computing devices, which is a computing device that the centralized peer-to-peer server has determined is sharing the Web content data capable of satisfying the client request; and
- computer usable program code configured to, when Web content data capable of satisfying the client request is not discovered by the centralized peer-to-peer server and when the bandwidth capabilities of the Web server are not capable of satisfying current requests without exhibiting degraded performance, direct the client request to one of the plurality of Web servers.

20. A computer program product comprising:
- a non-transitory computer usable medium having computer usable program code embodied therewith, the computer usable program code comprising:
- computer usable program code configured to monitor one or more downloads of Web content from one or more Web content servers, wherein each of the one or more downloads occurs via a client-server request from a Web browser of one of a set of at least two client computing devices and via receiving a corresponding response from one of the Web content servers;
- computer usable program code configured to store the one or more downloads of the Web content within Web browser caches of the set of client computing devices;
- computer usable program code configured to track, at each of the client computing devices, the storage of the one or more downloads of the Web content within Web browser caches of the set of client computing devices;
- computer usable program code configured to establish a peer group of a peer-to-peer network, which includes the set of client computing devices;
- computer usable program code configured to exchange Web content of the Web browser caches among the set of client computing devices via the peer-to-peer network, wherein the Web content is continuously updated based on user activities using the Web browser; and
- computer usable program code configured to determine whether bandwidth capabilities of a connection between the computing device originating the client-server request and the Web content servers prevent the Web content server from being not capable of satisfying current requests, which include the client-server request, without exhibiting degraded performance;
- computer usable program code configured to, when the bandwidth capabilities of the Web content servers are capable of satisfying current requests, which include the client-server request, without exhibiting degraded performance, responding to the client-server request using data from the Web content servers; and
- when bandwidth capabilities of the Web content servers are not capable of satisfying current requests, which include the client-server request, without exhibiting degraded performance, satisfying the client-server request-directed to one of the Web content servers utilizing Web content obtained from the shared Web browser cache of the first client computing device via the peer-to-peer network, wherein the client-server request is from the one of the computing devices to one of the Web content servers.

21. The computer program product of claim 20, wherein the Web content servers are peers of the peer-to-peer network, and wherein the Web content servers selectively redirect download requests to the Web browser caches to obtain Web content from the Web browser caches via the peer-to-peer network.

22. The computer program product of claim 20, wherein the Web content servers are not peers of the peer-to-peer network, and wherein the Web content servers never receive download requests issued from the computing devices that are satisfied utilizing Web content obtained from the Web browser caches via the peer-to-peer network.

23. The computer program product of claim 20, wherein the satisfied download requests are each a Hypertext Transfer Protocol (HTTP) or a Hypertext Transfer Protocol Secure (HTTPS) request, and wherein for each of the download requests the computing device that provided the Web content that satisfied the download requests is not referenced or explicitly indicated in the client request.

* * * * *